Figures 1, 2:
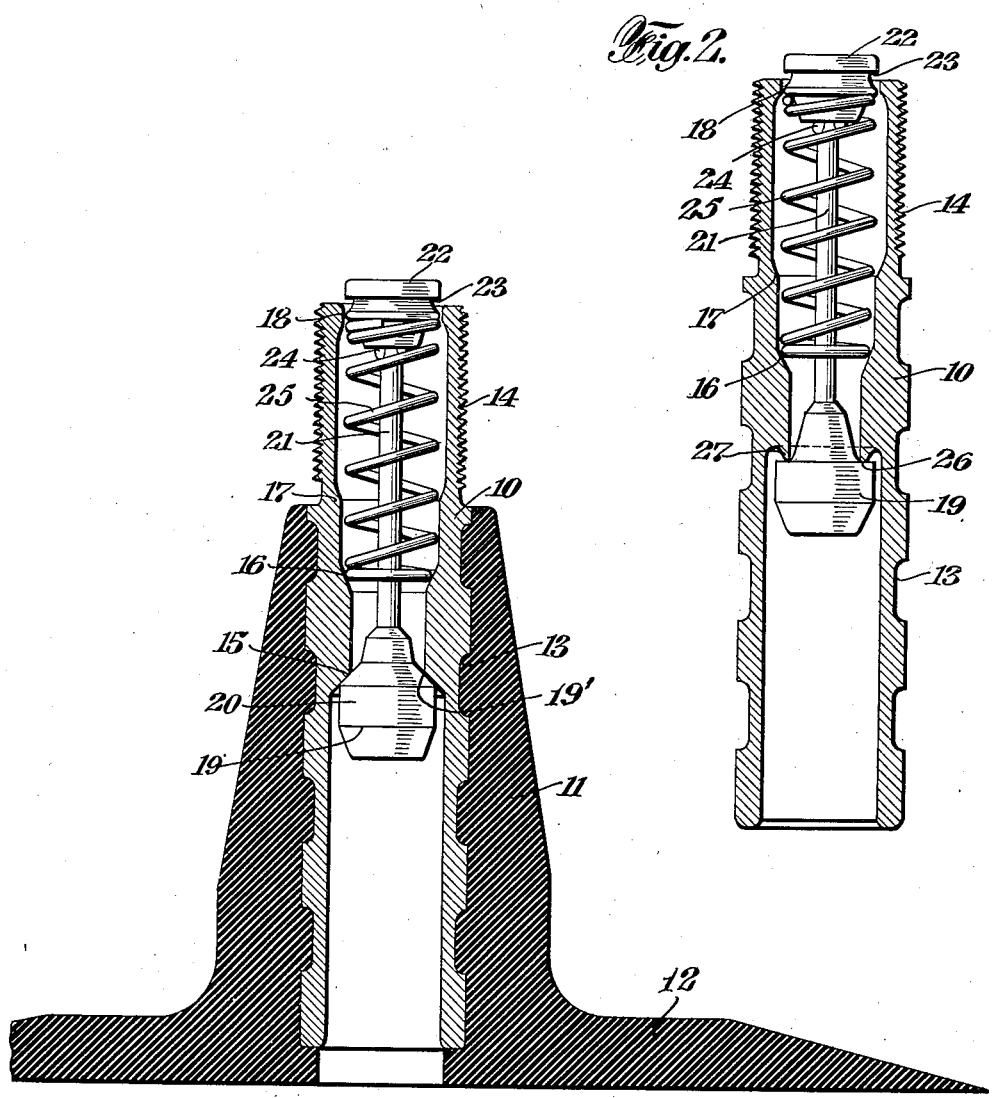

April 29, 1941.　　　L. C. BROECKER　　　2,240,129
VALVE
Filed Feb. 15, 1939

INVENTOR
Lewis C. Broecker
BY
Kenyon & Kenyon
ATTORNEYS.

Patented Apr. 29, 1941

2,240,129

UNITED STATES PATENT OFFICE 2,240,129

VALVE

Lewis C. Broecker, Bridgeport, Conn., assignor to Bridgeport Brass Company, Bridgeport, Conn., a corporation of Connecticut Application February 15, 1939, Serial No. 256,439

2 Claims. (Cl. 277—42)

This invention relates to valves and more especially to air valves for use in connection with pneumatic tires.

An object of this invention is an improved valve structure which eliminates objectionable features of the conventional type of valve by providing a valve assembly which is inherently simple, requires no cap, has only one seal and is economical to manufacture.

Other objects, novel features and advantages of this invention will become apparent from the following specification and accompanying drawing, wherein Fig. 1 is a longitudinal section through a valve embodying the invention, and Fig. 2 is a longitudinal section through a modification.

A tubular member 10 or metal stem is supported by a stem 11 of yieldable material such, for example, as rubber or rubber composition preferably provided with an integral flap or patch 12 adapted for vulcanization of the exterior surface of a tire tube, not shown. The metal stem 10 is provided with grooves 13 into which the rubber or other similar material projects to effect firm connection between the metal stem and the rubber stem.

The upper end of the metal stem 10 is preferably provided exteriorly with threads 14 of conventional size and form to permit use with the stem of a standard cap, if desired. The interior of the stem 10 is bored out to provide for the passage of air and this bore is of various diameters, and thus a tapered downwardly facing valve seat 15 (Fig. 1), and an upwardly facing shoulder 16 are provided in an intermediate zone therein. Above the point 17, the bore is of increased diameter but is of reduced diameter at the top edge 18. A valve member 19 of rubber or other suitable yielding and compressible material is attached by vulcanization or the like to a head at the lower end of a pin 21, this valve member being formed with a tapered portion or face 19' which is adapted to fit and engage the valve seat 15. A plug 22, preferably of metal, is attached to the upper end of the pin 21 and is of proper diameter to fit fairly snugly into the top of the stem 10, while being freely slidable therein. An annular groove 23 is provided in the periphery of the plug 22, thus forming a shoulder to facilitate removal as hereafter described. A slight enlargement 24 on the pin 21 prevents the plug 22 from sliding downwardly on the pin and the plug is attached to the pin by riveting or upsetting the top end thereof into a countersunk portion provided in the top of the plug. A coil spring 25 surrounds the center pin 21 and is positioned on and about the pin between the shoulder 16 and the plug 22, whereby the valve is normally held in engagement with its seat 15.

In the manufacture of the valve above described, the rubber stem 11 is first vulcanized to the metal stem 10, after which the rubber stem is attached to the inner tube while still uncured. The tube is now placed in the curing or vulcanizing mold and inflated with air or steam at relatively high pressure. When the curing process is completed, the air or steam is allowed to escape and must be entirely out of the tube before the mold can be opened and the tube removed. The length of time required to introduce and emit the air or steam from the inner tube during the vulcanization process is very important as slowness in this respect not only affects the rate of production, but will cause blistering of the outer surface of the tube. As the area of the small part of the bore through the metal stem 10 is nearly twice that of the bore through the casings now in use, the stem herein disclosed is therefore of decided advantage in the production of inner tubes. After the tube is vulcanized, the core is introduced into the valve stem. The cores now in use have to be screwed into the stem. This is a slow operation and, occasionally, a core will cross-thread resulting in breaking of the core and damaging of the stem. Such disadvantages are avoided in the present construction.

The core herein illustrated is introduced into the stem 10 by simply pushing it into place. The valve 19, spring 25 and plug 22 are all slightly smaller or less in diameter than the sections 17 and 18 of the stem and the core will readily move into the stem 10 until the valve 19 contacts that portion 16 of the bore just above the valve seat 15. By applying pressure against the top of the plug 22, the valve 19, being of yieldable or compressible material, will be forced through the restricted portion and below the valve seat 15. The spring 25, being slightly larger in diameter than the smallest portion of the bore, will seat on the shoulder 16, thus compressing the spring 25 and causing it to exert the necessary pressure against the plug 22 to hold the face 19' of the valve 19 tightly against the seat 15 as shown. When the valve is in closed position, as shown in the drawing, the plug 22 being only very slightly smaller than the interior diameter of the stem at 18, prevents foreign matter from entering the valve stem. For inflation purposes when an air chuck or gauge is applied to the stem 10, the plug 22 being engaged is pushed downwardly, thus pushing the pin 21 and forcing the valve 19 away from the seat 15, thereby allowing air to pass freely through the stem into the tube. Normally, the plug 22 protrudes slightly beyond the end of the stem 10, thus making it possible to remove the core by simply pulling it out with a pair of pliers or other suitable tool, such removal being facilitated by the annular groove 23 and the resultant shoulder. After removal of a faulty core, a new core may be inserted as previously described. This facility of replacement is a material advantage.

While it is possible to remove the core from the stem 10 by applying a moderate pull to the plug 22, there is no possibility of the core being blown out by air pressure, as it would take many times the pressure carried in pneumatic tubes to do this. No cap is required for the valve herein described but inasmuch as grooves or threads are necessary on the upper end of valve stems to enable the use of certain types of air chucks, standard cap threads are provided. Furthermore, a standard valve cap may be applied in the event that leakage develops and a new core is not immediately available.

The modification illustrated in Fig. 2 differs from the modification of Fig. 1 in respect of the valve seat and the shape of the valve body. In this modification, the valve body 19 is provided with an upwardly exposed flat surface 26 and the valve seat in the stem comprises an annular rib 27 extending downwardly for engagement with the surface 26. The valve body 19 is connected to the plug 22 by the pin 21 as in Fig. 1, while a spring 25 surrounding the pin has one end bearing against the shoulder 16 and the other end bearing against the plug 22 and is effective to draw the valve body 19 upwardly so as to bring the surface 26 into sealing engagement with the rib 27.

I claim:

1. A valve for use with inner tubes of tires or the like, comprising a hollow stem having a portion of reduced internal diameter intermediate its ends to provide a valve seat at one end of said portion and a shoulder at its other end spaced from said valve seat, a valve member of greater cross section than the inner edge of said valve seat and normally in contact with said seat, a pin connected to said valve member extending through said reduced portion and beyond said shoulder, a plug carried by said pin and so admeasured in diameter as substantially to close the end of said stem above said shoulder, a portion of said plug normally extending beyond said last named end when said valve is seated and having an annular groove and resultant shoulder to facilitate removal of said valve member pin and plug as a unit from said stem, said valve member being composed of yieldable material capable of sufficient deformation to permit the valve member to be passed through the narrowest internal portion of said stem but being of sufficient rigidity to resist expulsion from the said stem under normal pressure of air in the said stem, and a spring interposed between said shoulder and said plug to maintain said valve on its seat, said valve member, pin and plug being insertable and removable as a unit from said stem through its open end.

2. A valve for use with inner tubes of tires or the like, comprising a hollow stem of comparatively large internal diameter and having a portion of reduced internal diameter intermediate its ends to provide a valve seat at the bottom end of said portion and a shoulder at its upper end spaced from said valve seat, a valve member of greater cross section than the inner edge of said valve seat and normally in contact with said seat, a pin connected to said valve member and extending upwardly therefrom and beyond said shoulder, a plug fixedly carried at the upper end of said pin and so admeasured in diameter as substantially to close the upper end of said stem and serve as a dust seal, a portion of said plug normally extending beyond the upper end of said stem and formed with an annular groove and resultant shoulder in its projecting portion to facilitate removal of said valve member, pin and plug as a unit through the upper end of said stem, and a spring interposed between said shoulder and said plug to maintain said valve in its normal position on said seat, said valve member being composed of yieldable material capable of sufficient deformation to permit the valve member to be passed through the narrowest internal portion of said stem but being of sufficient rigidity and diameter to resist expulsion from said stem under normal pressure of air in said stem, and said valve member, pin and plug being insertable and removable as a unit from said stem through its upper end.

LEWIS C. BROECKER.